July 1, 1924.                         1,499,406
C. A. ROWLEY
DRAWING AND FLATTENING SHEET GLASS
Filed July 22, 1922
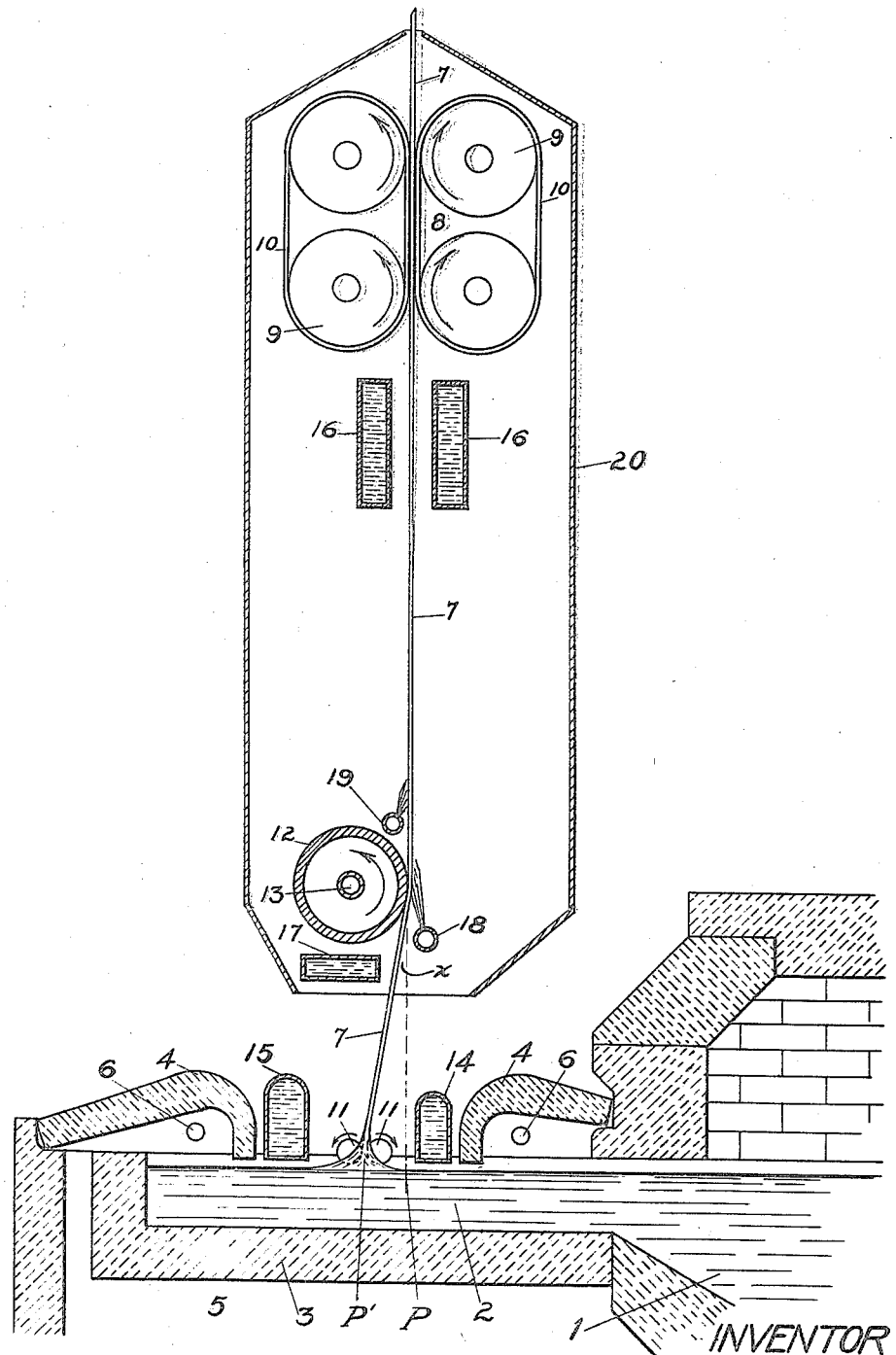
INVENTOR
Clifford A. Rowley Patented July 1, 1924.                                                           1,499,406

UNITED STATES PATENT OFFICE.

CLIFFORD A. ROWLEY, OF TOLEDO, OHIO, ASSIGNOR TO THE LIBBEY-OWENS SHEET GLASS COMPANY, OF TOLEDO, OHIO, A CORPORATION OF OHIO.

DRAWING AND FLATTENING SHEET GLASS.

Application filed July 22, 1922. Serial No. 576,668.

*To all whom it may concern:*

Be it known that I, CLIFFORD A. ROWLEY, a citizen of the United States, residing at Toledo, in the county of Lucas and State of Ohio, have invented new and useful Improvements in Drawing and Flattening Sheet Glass, of which the following is a specification.

This invention relates to the art of drawing sheet glass, and more particularly to an improved method and apparatus for continuously drawing a sheet of glass upwardly from a bath of molten glass, and flattening the sheet in the vertical plane.

When a sheet of glass is drawn in a horizontal plane, or bent into a horizontal plane while still plastic it will tend to sag between its supports due to the influence of gravity, and it is necessary to provide some practically continuous flat supporting table for the sheet, while it is becoming set in final sheet form. This supporting or flattening table is usually in the form of an endless belt, composed of suitably linked or articulated members. The breaks or joints in this table often mar or injure the sheet. If the system be such that the sheet of glass is drawn vertically upward, and the drawing means is positioned some distance above the molten bath of glass, so that the sheet will have time to set and harden before it reaches the drawing means, the sheet is apt to be waved and corrugated due to uneven temperature conditions about its forming zone, and the absence of any flattening surface or guiding straight-edge for the sheet while it is yet in a plastic stage.

In the Colburn system of drawing sheet glass, (as shown for example in the patent to I. W. Colburn, 1,248,809, granted Dec. 4, 1917), the sheet is drawn upwardly from a mass of molten glass, and while partially set but still somewhat plastic is bent in the horizontal plane about a cooled polished metallic bending roller. It has been demonstrated with this apparatus that if the contacting surfaces of the glass sheet and the roller have been sufficiently cooled, and the surface of the roller is perfectly smooth, there will be no injury to the fine fire-polished surface of the sheet during this bending process. At the same time this bending roller serves as a straight-edge for guiding and directing the sheet during its upward run, and aids in producing a flatter sheet. This apparatus has also demonstrated that the sheet of glass will tend to draw from the cooler and more tenacious glass in the container, and if the molten glass at one side or the other of the sheet source is cooler than the glass at the opposite side, the sheet will not draw up in a vertical plane but will incline up to the bending roll at an angle, slanting from the surface of the bending-roll down toward the cooler glass.

The above noted principles have been used in the present apparatus for drawing a continuous sheet of glass upwardly and flattening the sheet in the vertical plane without the use of any flattening or supporting member. The objects of the invention are to simply and expeditiously produce a flat glass sheet, with less liability of injury to the fire-polished surfaces of the sheet than is found with prior devices.

The nature and objects of the invention will be more clearly understood from the following detailed description of an apparatus for carrying out the principles of the invention.

The accompanying drawing is a vertical section through the sheet drawing mechanism, many of the parts being shown somewhat diagrammatically, for the sake of clearness.

At 1 is shown the outlet end of a continuous tank furnace, or other source of molten glass, from which the glass 2 flows into the receptacle or draw-pot 3. The molten glass at either side of the sheet-source is enclosed by covering tiles 4, and the temperature of the glass in the pot 3 is controlled and maintained by heaters in the chamber 5 below the pot, and by burners 6 beneath the covering tiles.

The glass sheet 7 is drawn upwardly from the molten glass 2 by a drawing mechanism illustrated conventionally at 8. This drawing mechanism is located some distance above the pot 3, and only engages the sheet after it has become entirely set in final sheet form. The sheet surfaces are by this time so hardened that they are less apt to suffer injury or deformation from contacting surfaces. As here shown the drawing mechanism consists of a set of driven rollers 9, which are rotated in the direction of the arrows, and an endless belt 10 is looped about the pair of rollers at either side of the sheet. These belts may be made of asbestos or a suitable metallic alloy with a highly polished surface, which will not scratch the sheet while in contact therewith. Or the drawing mechanism might consist simply of a pair of rollers between which the sheet is gripped, or of a plurality of pairs of rollers such as 9, with the belts omitted. However, a drawing mechanism of the type indicated in the drawings will have more tractional engagement with the sheet, and there will be less tendency for slippage and scratching than with the roller type of drawing means.

At the sheet source, a pair of edge-gripping rollers 11 engage the sheet edge at either side of the sheet. These rollers are positively driven in the direction of the arrows, at a slower peripheral speed than the drawing means 8. They function to positively feed molten glass up into the sheet edges, and at the same time hold back on the edges of the sheet, placing a stretching tension thereon which acts to maintain the sheet to width, and prevent the narrowing that would take place if these edge rollers were not used. These width-maintaining rollers are the same as those disclosed in the Colburn patent referred to above and need not be further described.

Suitably positioned between the sheet source and the drawing means 8, is a sheet guiding and deflecting member 12, here shown as a metallic roller or cylinder, having a smooth highly polished glass-engaging surface. This roller is mounted to turn freely in roller bearings, and is internally cooled, preferably by cold air forced in as at 13. The glass engaging surface of this roller 12 is arranged in the same vertical plane as the glass engaging surface of the belts 10, so that the glass sheet travels in a single vertical plane in the stretch between the deflecting and guiding member 12 and the drawing mechanism 8.

If the molten glass 2 in the receptacle 3 were maintained at the same temperature and tenacity at the two sides of the sheet source, the sheet would be drawn from the pool 2 at a point P directly beneath the drawing mechanism in the same vertical plane as the sheet engaging surfaces of the roller 12, and the drawing mechanism 8. In that case, there would be nothing to positively tension the sheet 7 against the surface of the roller 12, and this roller would have no positive guiding and flattening influence on the sheet. Means will now be described for maintaining a tensioned contact between the sheet and the roller 12.

At the sides of the sheet source, in close proximity to the surface of the pool 2, are a pair of cooling members 14 and 15. These coolers are preferably in the form of closed metallic vessels through which a constant flow of cold water or other fluid is maintained. This water absorbs and carries away heat from the sheet, and the surface glass from which the sheet is drawn. This greatly increases the tenacity of this glass, and allows the drawing action to be carried on at a much greater speed than would be possible if the coolers were not used. In the present apparatus the cooler 15 is made larger than the cooler 14, so that it will have a greater heat absorbing capacity and maintain the glass at the left of the sheet (beneath the roller 12) at a lower temperature than the glass at the right of the sheet. This will cause the sheet source to move over from its natural position P, to a point P' in the cooler glass, due to the well known tendency of the glass to draw from the cooler and more tenacious glass. The sheet will now pass up to the roller 12 at a slight angle $x$ with the vertical plane, and be deflected about the surface of the roller into the vertical. This action will maintain a continual tension of the sheet 7 against the surface of the deflecting roller.

The rectilinear surfaces of the roller 12 and the drawing mechanism 10, which lie in the same vertical plane determine the plane of the glass sheet. Since the glass is traveling vertically between the roller and the drawing mechanism, the force of gravity will not tend to bow the sheet in either direction. Since the sheet is held under drawing tension while passing through the space between the roller and the drawing mechanism, if there are no disturbing influences such as air-currents or unequal temperature conditions there will be nothing to bow or warp the sheet, and it will set absolutely flat. The sheet cools off, aided by coolers 16 at the sides of the sheet, during this run between the roller 12 and the drawing mechanism to such a temperature that it is set in final sheet form, although subsequent annealing is necessary to bring it down to normal temperatures.

The height of the roller 12 above the pool 2 will be such that the sheet will be practically formed, but still somewhat plastic and capable of being bent without injury before it reaches the roller. To aid in this deflecting operation a small cooler 17 is located just below the roller 12. This cooler functions to cool the surface of the roller and the adjacent surface of the glass to prevent the hot sheet from sticking to the roller. A heater 18 here shown as a series of burners playing across the width of the sheet just as it leaves the deflecting roller, acts to partially soften the sheet at this point so that it will readily straighten out in the vertical plane and not retain the curvature imparted to it by the deflecting member. If found necessary for this purpose, a second heater 19 may be used at the other side of the sheet just above the roller. A protecting casing, indicated conventionally at 20, surrounds the sheet during this flattening period, to assist in maintaining equalized temperature conditions about the sheet, and avoid disturbing air currents.

It is to be understood that other means for varying the temperature conditions at the sides of the sheet source might be employed. Coolers of the same size might be positioned at different distances from the molten glass, or different degrees of heat might be applied to the different areas of glass in the receptacle 3.

The system of drawing and flattening sheet glass, as here disclosed is simple and effective, and one less apt to injure the surfaces of the sheet than those now in use. During its formative period, and until the sheet is completely set and flattened, it has contact with but one member—the polished deflecting roller 12. There is only a small arc of contact with this roller, and if the roller is in good condition, no injury to the sheet whatever can result from this contact. The sheet is completely set and flattened, and less liable to surface injuries, by the time it passes through the drawing mechanism 8. After passing above the drawing mechanism, the sheet should be cut into sections and passed through an annealing leer. It is contemplated that this be done automatically, but the mechanism for accomplishing this is not a part of the present invention and is not here disclosed.

Claims:

1. The method of drawing and flattening sheet glass, consisting in drawing the sheet upwardly from a mass of molten glass at a slight angle to the vertical, deflecting the sheet into the vertical plane, maintaining the sheet under tension in the vertical plane and allowing the sheet to set and flatten while free from any contacting surface.

2. The method of drawing and flattening sheet glass, consisting in drawing a sheet of glass upwardly from a mass of molten glass, maintaining unequal temperature conditions at the two sides of the sheet source so that the sheet will draw up at an angle to the vertical, and deflecting the sheet into the vertical plane, the sheet drawing means being located at such a height above the deflecting member that the sheet may become flat and set in the vertical plane before the drawing means contacts therewith.

3. The method of drawing and flattening sheet glass, consisting in drawing a sheet of glass upwardly from a mass of molten glass past a cylindrical roller, and maintaining the temperature conditions unequal at the two sides of the sheet source so that the sheet will be drawn from beneath the roller and be deflected thereby into the vertical plane.

4. The method of drawing and flattening sheet glass, consisting in drawing a sheet of glass upwardly from a mass of molten glass past a rotatable flattener, and maintaining the temperature conditions unequal at the two sides of the sheet source so that the sheet will be drawn from beneath the flattener and be deflected thereby into the vertical plane.

5. The method of drawing sheet glass upwardly from a mass of molten glass at an angle to the vertical, consisting in maintaining constant but unequal temperature conditions at the two sides of the sheet source.

6. The method of drawing sheet glass upwardly from a mass of molten glass at an angle to the vertical, consisting in withdrawing more heat units from the molten glass at one side of the sheet source than the other.

7. In an apparatus for drawing and flattening sheet glass, a receptacle containing a mass of molten glass, means for drawing a continuous sheet of glass upwardly therefrom, a deflecting member for the sheet positioned between the molten glass and the drawing means, and having its sheet engaging surface in vertical alignment with the sheet engaging surface of the drawing means, and temperature control means for maintaining the sheet source out of this vertical alignment.

8. In an apparatus for drawing and flattening sheet glass, a receptacle containing a mass of molten glass, means for drawing a continuous sheet of glass upwardly therefrom, a deflecting member for the sheet positioned between the molten glass and the drawing means, and having its sheet engaging surface in vertical alignment with the sheet engaging surface of the drawing means, and means for maintaining the molten glass at the sheet source cooler at the sheet side beneath the deflecting member, to hold the sheet in tensioned engagement with the surface of the deflecting member.

9. In an apparatus for drawing and flattening sheet glass, a receptacle containing a mass of molten glass, means for drawing a continuous sheet of glass upwardly therefrom, a deflecting member for the sheet positioned between the molten glass and the drawing means, and having its sheet engaging surface in vertical alignment with the the sheet engaging surface of the drawing means, and a pair of coolers one at either side of the sheet source, the cooler at the side beneath the deflecting member having the greater heat absorbing capacity.

10. In an apparatus for drawing and flattening sheet glass, a receptacle containing a supply of molten glass, means for continuously drawing a sheet of glass upwardly therefrom, a cooled cylindrical roller positioned above the molten glass and below the drawing means, and having its sheet engaging surface in vertical alignment with the sheet engaging surface of the drawing means, and temperature control means for maintaining the sheet source beneath the roller, to hold the drawing sheet in tensioned engagement with the roller surface.

Signed at Toledo, in the county of Lucas, and State of Ohio this 20th day of July, 1922.

CLIFFORD A. ROWLEY.